US008013494B2

United States Patent
Morioke (10) Patent No.: US 8,013,494 B2
(45) Date of Patent: Sep. 6, 2011

(54) VIBRATION ACTUATOR DRIVING DEVICE, LENS BARREL, CAMERA, METHOD OF MANUFACTURING ELECTROMECHANICAL CONVERSION ELEMENT, METHOD OF MANUFACTURING VIBRATION ACTUATOR, AND METHOD OF DRIVING VIBRATION ACTUATOR

(75) Inventor: Toshikazu Morioke, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/767,769

(22) Filed: Apr. 26, 2010

(65) Prior Publication Data

US 2010/0201225 A1    Aug. 12, 2010

Related U.S. Application Data

(62) Division of application No. 12/056,855, filed on Mar. 27, 2008, now Pat. No. 7,732,980.

(30) Foreign Application Priority Data

Mar. 30, 2007    (JP) ................................. 2007-092925

(51) Int. Cl.
H01L 41/107    (2006.01)
H01L 41/047    (2006.01)

(52) U.S. Cl. ....................................... 310/315; 310/366

(58) Field of Classification Search .................. 310/315, 310/323.04, 323.06, 323.08, 366
See application file for complete search history.

(56) References Cited

U.S. PATENT DOCUMENTS

| 4,562,374 | A | 12/1985 | Sashida |
| 4,829,209 | A | 5/1989 | Kawasaki et al. |
| 4,831,305 | A | 5/1989 | Mukohjima et al. |
| 4,882,500 | A | 11/1989 | Iijima |
| 5,006,746 | A | 4/1991 | Kasuga et al. |
| 5,025,186 | A | 6/1991 | Tsukada |
| 5,237,237 | A | 8/1993 | Ueda et al. |
| 5,632,074 | A | 5/1997 | Kanazawa |
| 5,744,897 | A * | 4/1998 | Takagi et al. ............ 310/316.02 |
| 5,798,598 | A | 8/1998 | Fujimoto |
| 6,064,140 | A | 5/2000 | Zumeris |
| 6,175,181 | B1 | 1/2001 | Shirasaki |
| 6,924,940 | B2 * | 8/2005 | Koga et al. ..................... 359/694 |
| 6,943,481 | B2 | 9/2005 | Okamoto et al. |
| 6,952,073 | B2 | 10/2005 | Yamamoto |
| 7,786,648 | B2 * | 8/2010 | Xu et al. ....................... 310/317 |
| 2002/0195892 | A1 | 12/2002 | Okamoto et al. |

FOREIGN PATENT DOCUMENTS

| JP | 9-103082 | | 4/1997 |
| JP | 64-008874 | * | 1/1999 |
| JP | 2003-033056 | | 1/2003 |

OTHER PUBLICATIONS

Extended European Search Report for corresponding EP Application No. 08006045.2-2222, Dec. 14, 2010.

* cited by examiner

*Primary Examiner* — Thomas M Dougherty
(74) *Attorney, Agent, or Firm* — Ditthavong Mori & Steiner, P.C.

(57) ABSTRACT

A vibration actuator driving device includes a plurality of wiring sections and a supply controller. The plurality of wiring sections are disposed correspondingly to a plurality of electrically independent electrodes of an electromechanical conversion element. The wiring sections input driving signals to drive the electromechanical conversion element. The supply controller is capable of independently supplying a driving signal for each respective wiring section.

12 Claims, 6 Drawing Sheets

VIBRATION ACTUATOR DRIVING DEVICE, LENS BARREL, CAMERA, METHOD OF MANUFACTURING ELECTROMECHANICAL CONVERSION ELEMENT, METHOD OF MANUFACTURING VIBRATION ACTUATOR, AND METHOD OF DRIVING VIBRATION ACTUATOR

CROSS-REFERENCE TO RELATED APPLICATIONS

The present application is a divisional application of U.S. patent application Ser. No. 12/056,855, filed Mar. 27, 2008, which claims priority under 35 U.S.C. §119 to Japanese Patent Application No. 2007-092925, filed Mar. 30, 2007. The contents of these applications are incorporated herein by reference in their entirety.

BACKGROUND OF THE INVENTION

1. Field of the Invention

The present invention relates to a vibration actuator driving device, a lens barrel, a camera, a method of manufacturing an electromechanical conversion element, a method of manufacturing a vibration actuator, and a method of driving a vibration actuator.

2. Discussion of the Background

Japanese Unexamined Patent Application Publication No. Hei 9-103082 proposes the technique of adjusting an electrostatic capacitance value to a specified value by connecting an external capacitor to a piezoelectric element.

However, the electrostatic capacitance value of the piezoelectric element for driving an ultrasonic motor generally has a positive temperature coefficient (the electrostatic capacitance value increases with increasing temperature), and will vary with environmental temperature and the like.

Therefore, the vibration characteristics of the piezoelectric element will also vary with environmental temperature and the like. For example, when the piezoelectric element is used as the driving source of a lens drive motor, it may be difficult to obtain the desired drive characteristics.

SUMMARY OF THE INVENTION

According to one aspect of the present invention, a vibration actuator driving device includes a plurality of wiring sections and a supply controller. The plurality of wiring sections are disposed correspondingly to a plurality of electrically independent electrodes of an electromechanical conversion element. The wiring sections input driving signals to drive the electromechanical conversion element. The supply controller is capable of independently supplying a driving signal for each respective wiring section.

According to another aspect of the present invention, a lens barrel includes a vibration actuator driving device and a lens to be driven by a vibration actuator. The vibration actuator driving device includes a plurality of wiring sections and a supply controller. The plurality of wiring sections are disposed correspondingly to a plurality of electrically independent electrodes of an electromechanical conversion element. The wiring sections input driving signals to drive the electromechanical conversion element. The supply controller is capable of independently supplying a driving signal for each respective wiring section.

According to still another aspect of the present invention, a camera includes a vibration actuator driving device and a lens to be driven by a vibration actuator. The The vibration actuator driving device includes a plurality of wiring sections and a supply controller. The plurality of wiring sections are disposed correspondingly to a plurality of electrically independent electrodes of an electromechanical conversion element. The wiring sections input driving signals to drive the electromechanical conversion element. The supply controller is capable of independently supplying a driving signal for each respective wiring section.

According to yet still another aspect of the present invention, a method of manufacturing an electromechanical conversion element includes forming a polarization part polarized in a certain direction in a piezoelectric body. A plurality of separated electrodes are formed on a surface of a continuous region of the polarization part.

According to another aspect of the present invention, a method of manufacturing a vibration actuator includes forming a polarization part polarized in a certain direction in a piezoelectric body. A plurality of separated electrodes are formed in a continuous region of the polarization part. An elastic body is provided in contact with the piezoelectric body so as to cause vibration due to driving of the piezoelectric body. A relatively moving member is provided in contact with a portion different from the portion of the electromechanical conversion element of the elastic body, so as to move relative to the elastic body by the vibration.

According to another aspect of the present invention, a method of driving a vibration actuator includes providing a plurality of wiring sections corresponding to a plurality of electrically independent electrodes of an electromechanical conversion element. Driving signals are independently supplied to each of the plurality of wiring sections to drive the electromechanical conversion element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention will be described in detail with reference to the accompanying drawings. In the following embodiments, an ultrasonic motor using an ultrasonic vibration range is exemplified and described.

First Embodiment

Figure 1:
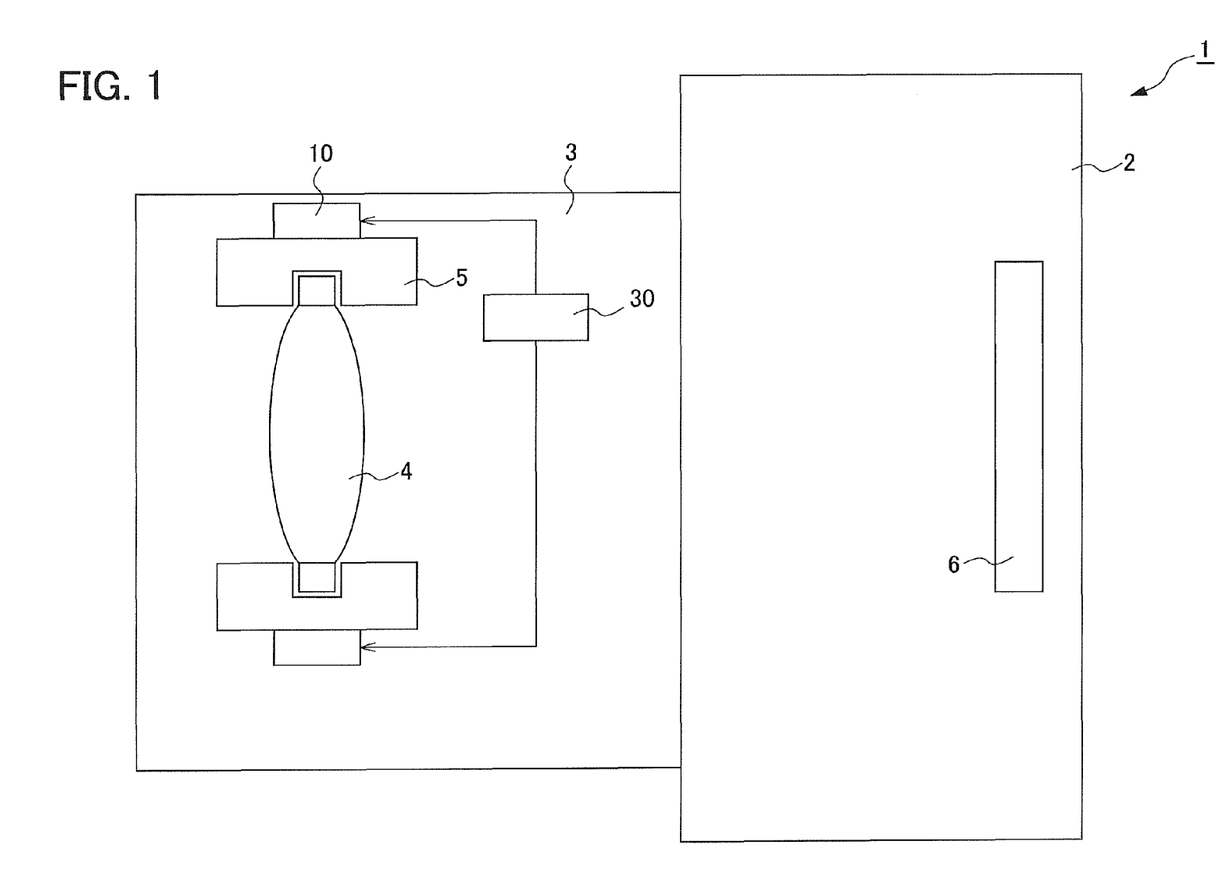
FIG. 1 is a diagram showing a camera according to a first embodiment.

FIG. 1 is a diagram showing a camera according to a first embodiment.

A camera 1 of the present embodiment is provided with a camera body 2 having an image pickup device 6, and a lens barrel 3. The lens barrel 3 is an interchangeable lens removably attached to the camera body 2. In the camera 1, the lens barrel 3 is an interchangeable lens by way of example. However, it is not limited to this. Alternatively, the camera may be a camera provided with a lens barrel integral to the camera body.

The lens barrel 3 is provided with a lens 4, a cam barrel 5, an ultrasonic motor 10 and an ultrasonic motor driving device 30. In the present embodiment, the ultrasonic motor 10 is used as the driving source to drive the lens 4 when the camera 1 performs a focus operation, and the driving force generated by the ultrasonic motor 10 is transmitted to the cam barrel 5. The lens 4 is cam-engaged with the cam barrel 5. When the cam barrel 5 is rotated by the driving force of the ultrasonic motor 10, owing to the cam-engagement with the cam barrel 5, the lens 4 is shifted along the optical axis direction of the lens 4, and focus adjustment is carried out.

Figure 2:
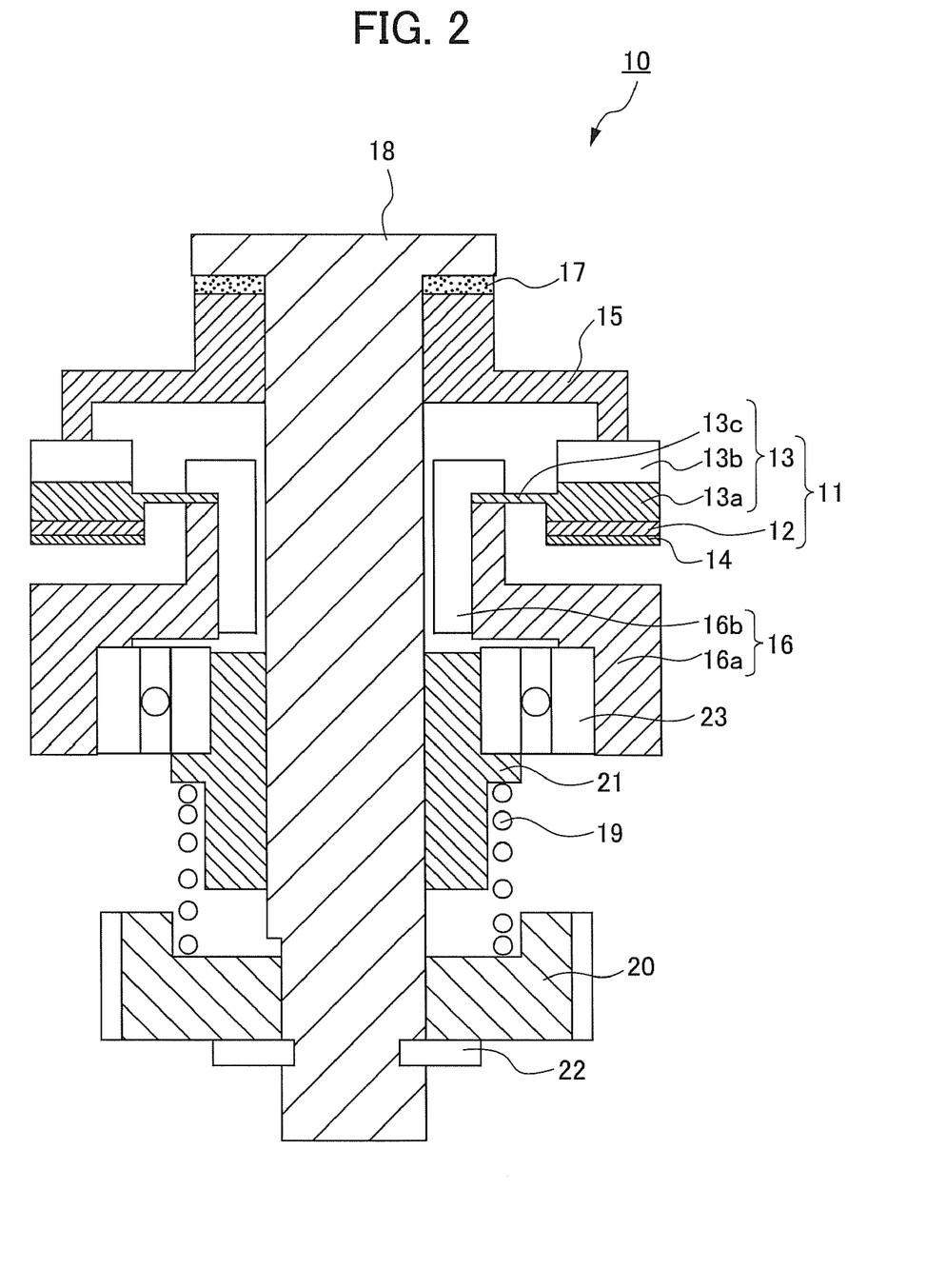
FIG. 2 is a sectional view showing an ultrasonic motor in the first embodiment.

FIG. 2 is a sectional view showing the ultrasonic motor of the first embodiment.

The ultrasonic motor 10 of the first embodiment is a device that has a vibrating body (stator) 11 causing vibrations so as to generate vibration energy, and extracts the vibration energy as an output, thereby obtaining a driving force.

The ultrasonic motor 10 is provided with the vibrating body 11 having a piezoelectric element 12 and an elastic body 13, and a moving body 15 (rotor) to be pressed into contact with a driving surface of the elastic body 13. The generation of a vibration wave in the vibrating body 11 causes relative movement between the vibrating body 11 and the moving body 15. In the configuration of the present embodiment, the vibrating body 11 is firmly secured, and the moving body 15 moves relative to the vibrating body 11.

The vibrating body 11 is provided with the piezoelectric element 12 as an electromechanical conversion element constructed to convert electrical energy to mechanical energy, and the elastic body 13 connecting the piezoelectric element 12. A progressive vibration wave (hereinafter referred to as "progressive wave") due to excitation of the piezoelectric element 12 occurs in the vibrating body 11. Instead of the piezoelectric element, an electrostrictive element or the like may be used as an electromechanical conversion element.

The elastic body 13 is an annular member formed by a metal material with a sharp resonance. The elastic body 13 is provided in contact with the piezoelectric element 12, and vibrates due to the drive of the piezoelectric element 12. A comb-finger part 13b provided with a groove is disposed on a surface opposite the surface to which the piezoelectric element 12 is connected. The front end face (a groove-free area) of the comb-finger part 13b serves as a driving surface, which is pressed into the moving body 15. The reason for forming the groove is to bring the neutral surface of the progressive wave as near to the side of the piezoelectric element 12 as possible, thereby increasing the amplitude of the progressive wave on the driving surface. The piezoelectric element 12 is connected to a surface of a base part 13a where no groove is formed, namely, the surface opposite to the groove. The elastic body 13 has its driving surface subjected to NiP surface treatment.

The elastic body 13 has a flange part 13c on the inner peripheral side of the base part 13a, and the flange part 13c is used to fix the elastic body 13 to fixing members 16 (16a and 16b). The flange part 13c is located in the vicinity of the center in the thickness direction of the base part 13a.

The piezoelectric element 12 is divided circumferentially into regions corresponding to two phases (A phase and B phase). In the regions corresponding to these two phases, elements of alternate polarity directions are arranged by a predetermined circumferential length. In the piezoelectric element 12, an FPC (flexible printed circuit) 14 is connected to the electrodes of the respective phases. A driving signal for exciting the piezoelectric element 12 is input through the FCP 14 to the piezoelectric element 12.

The moving body 15 is provided contacting a portion of the vibrating body 11 different from the portion where the piezoelectric element 12 is provided. The moving body 15 is a member that moves relative to the vibrating body 11 due to the vibration of the elastic body 13. The moving body 15 is composed of a light metal such as aluminum, and an alumite surface treatment for improving the wear resistance is applied to the surface of a sliding face to be contacted with the vibrating body 11.

An output shaft 18 is coupled to the rotator 15 with a rubber member 17 in between, and is integrally rotated with the rotator 15. The rubber member 17 between the output shaft 18 and the rotator 15 performs the function of connecting the rotator 15 and the output shaft 18 by the rubber's stickiness, and has the function of absorbing the vibration in order to prevent the transmission of the vibrations from the rotator 15 to the output shaft 18. The rubber member 17 is made of butyl rubber or the like.

A pressurizing member 19 is, for example, a coil spring, and is provided between a gear member 20 fixed to the output shaft 18 and a bearing holder 21. The gear member 20 is inserted so as to be fitted into a D-cut of the output shaft 18, and is firmly secured by a stopper 22 such as an E-clip so that the gear member 20 can be integral with the output shaft 18 in a rotative direction and an axial direction. It is also arranged that the bearing holder 21 is inserted into the inner diameter side of the bearing 23, and the bearing 23 is inserted into the inner diameter side of the fixing member 16a. With this arrangement, the rotator 15 can be pressed into contact with the driving surface of the vibrating body 11.

Figure 3A:
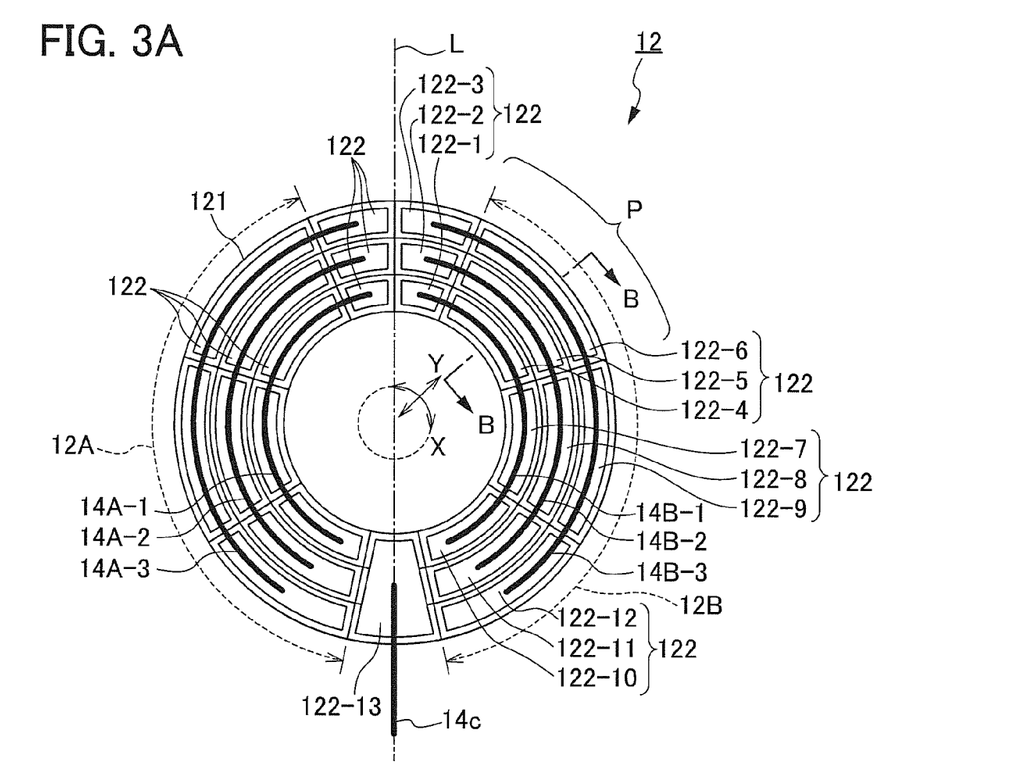
FIG. 3A is a drawing showing the details of a piezoelectric element in the first embodiment.
Figure 3B:
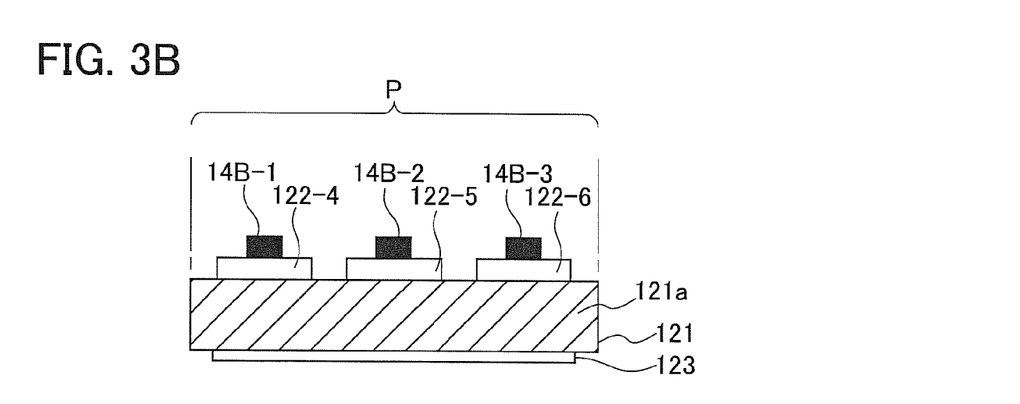
FIG. 3B is a drawing showing the details of a piezoelectric element in the first embodiment.

FIGS. 3A and 3B are drawings showing the details of the piezoelectric element 12 of the first embodiment. FIG. 3A is a plan view of the piezoelectric element 12, and FIG. 3B is a sectional view taken along the line B-B in FIG. 3A.

The piezoelectric element 12 is provided with an A-phase piezoelectric element 12A and a B-phase piezoelectric element 12B, to which driving signals of different phases are respectively input. The A-phase piezoelectric element 12A and the B-phase piezoelectric element 12B are approximately bilaterally symmetric with respect to a line L passing through the center of the annular piezoelectric element 12. A plurality of electrodes 122 formed on the piezoelectric element 12 are provided at their respective corresponding positions of the A-phase piezoelectric element 12A and the B-phase piezoelectric element 12B. These electrodes 122 are arranged to be approximately bilaterally symmetric with respect to the line L.

As shown in FIG. 3B, the piezoelectric element 12 is provided with a piezoelectric body 121 having a polarization part 121a polarized in a certain direction, which is represented by the slant lines, and a plurality of electrodes 122-4 to 122-6 formed separately and electrically independent from one another on the surface of a continuous region P of the polarization part 121a.

As shown in FIG. 3B, an electrode 123 is formed on a surface opposite the surface on which the electrodes 122-4 to 122-6 of the piezoelectric body 12 are formed. The electrode 123 is divided neither radially nor circumferentially, that is, it is formed continuously over the entire surface of the piezoelectric body 14.

As shown in FIG. 3A, the region P is in the shape of substantially a sector (a sector whose middle part is removed), and this region is polarized in a certain direction (for example, in the direction from the electrodes 122-4 to 122-6 to the electrode 123). The adjacent substantially sector-shaped region is polarized in the opposite direction to the region P. These two types of regions continuously alternate with each other along the radial direction X.

As shown in FIG. 3A, the piezoelectric body 121 has an annular shape, and the plurality of the electrodes 122-4 to 122-6 are arranged into sections (divisions) in the radial direction Y in the continuous region P of the piezoelectric body 121.

In addition to the sections in the radial direction Y (the electrodes 122-1, 122-2 and 122-3; the electrodes 122-4, 122-5 and 122-6; the electrodes 122-7, 122-8, 122-9; and the electrodes 122-10, 122-11 and 122-12), the electrode 122 of the piezoelectric element 12 is also divided in the circumferential direction X (the electrodes 122-1, 122-4, 122-7 and 122-10; the electrodes 122-2, 122-5, 122-8 and 122-11; and the electrodes 122-3, 122-6, 122-9 and 122-12). The electrodes on the A-phase side have the same configuration.

Further, A-phase side FPCs 14A-1 to 14A-3, and B-phase side FPCs 14B-1 to 14B-3 are connected to the electrode 122 divided in the circumferential direction X, respectively (for example, the B-phase side FPC 14B-1 is connected to the electrodes 122-1, 122-4, 122-7 and 122-10), and wiring is arranged so that the driving signals can be respectively input independently to the electrodes divided in the circumferential direction X.

On the other hand, the electrode 122-13 is a grounding electrode, to which a grounding FPC 14 is connected. The surface of the piezoelectric element 12 with the electrode 123 formed thereon is bonded to the elastic body 13 with adhesive. The elastic body 13 is grounded, and the grounding electrode 122-13 is connected to the elastic body 13 with a conductive material (not shown) in between. Thus, the grounding electrode 122-12 and the grounding FPC 14C are grounded.

The electrode 123 of the piezoelectric element 12 is connected to the elastic body 13, and adhesive is interposed between the electrode 123 and the elastic body 13. Although the adhesive normally has no conductivity, there are portions where the electrode 123 and the elastic body 13 contact and become conductive towards each other, because the adhesive layer is thin and the surface on the side of the piezoelectric element 12 is rough. Hence, the electrode 123 of the piezoelectric element 12 and the elastic body 13 become conductive, and the electrode 123 is also grounded.

Unlike the electrodes in the region P, the grounding electrode 122-13 is not divided. The grounding electrode 122-13 is provided between a portion corresponding to the A-phase and a portion corresponding to the B-phase in the circumferential direction on the piezoelectric element 12. The circumferential length of the grounding electrode 122-13 corresponds to a quarter-wavelength of the wavelength of the vibration wave to be generated in the piezoelectric element 12 when the driving signal is input to the A-phase or the B-phase electrode. The circumferential lengths of the electrodes 122-4 to 122-6 and the electrodes 122-7 to 122-9 correspond to a half-wavelength of the wavelength of the vibration wave to be generated in the piezoelectric element 12 when the driving signal is input to the B-phase electrode.

Figure 4:
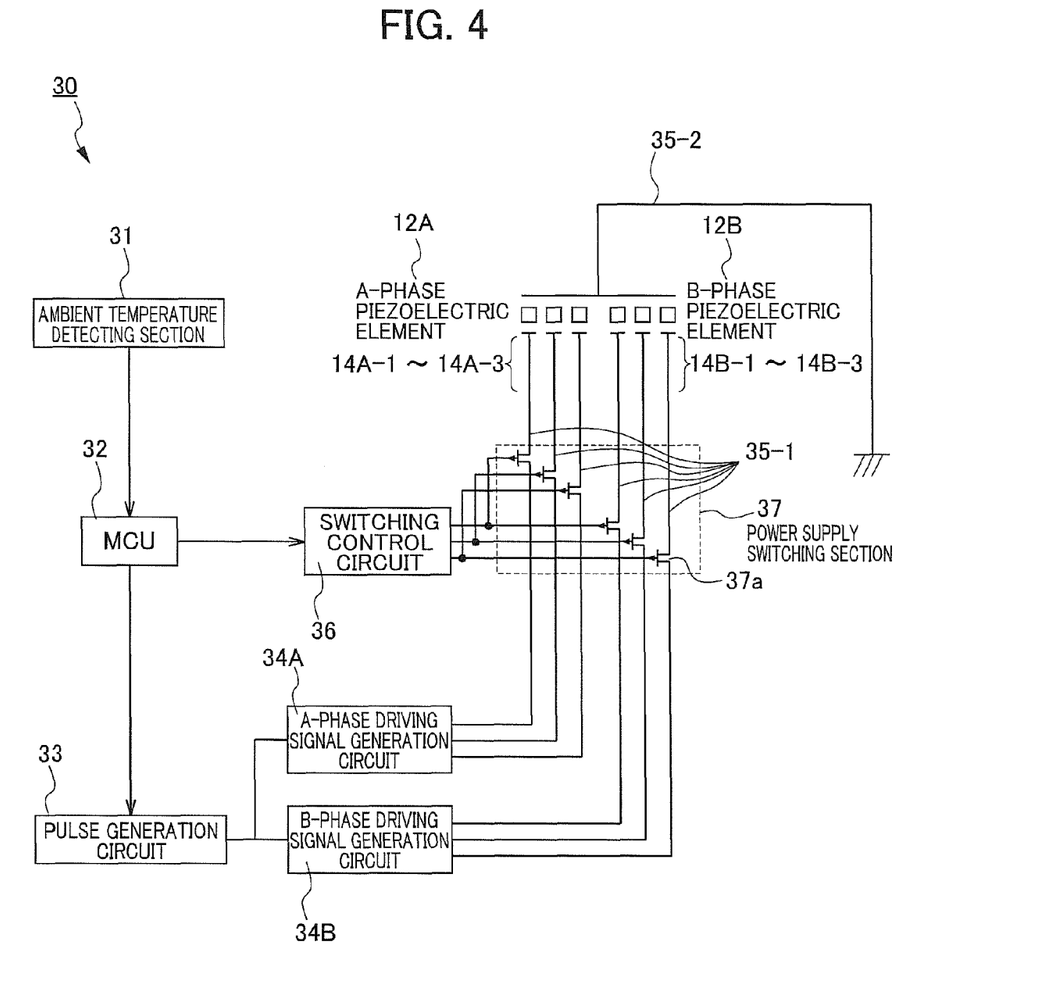
FIG. 4 is a diagram showing an ultrasonic motor driving device in the first embodiment.

FIG. 4 is a diagram showing an ultrasonic motor driving device in the first embodiment.

The ultrasonic motor driving device 30 is provided with an ambient temperature detecting section 31, an MCU (micro control unit) 32, a pulse generation circuit 33, an A-phase driving signal generation circuit 34A, a B-phase driving signal generation circuit 34B, wiring sections 35-1, a wiring section 35-2, a switching control circuit 36 and a power supply switching section 37.

The ambient temperature detecting section 31 is a device to detect the ambient temperature and send the detection results such as temperature information to the MCU 32. Preferably, the ambient temperature detecting section 31 is disposed so that it can detect the temperature of the piezoelectric element 12 or its surroundings. This enables more direct measurement of the temperature close to the temperature of the piezoelectric element 12.

The MCU 32 is a section to generally control the ultrasonic motor driving device 30, and control the pulse generation circuit 33 and the switching control circuit 36.

The MCU 32 also controls the driving signal supply conditions in response to the detection result obtained at the ambient temperature detecting section 31.

There is a tendency for the electrostatic capacity value of the piezoelectric element 12 to be generally small at low temperatures and large at high temperatures. Therefore, under low temperatures, a small electrostatic capacity may cause a deterioration of driving characteristics.

This can be overcome by preliminarily using a piezoelectric element having a large electrostatic capacity value. In this case, however, the electrostatic capacity value becomes too large at high temperatures, resulting in poor matching with the driving device. As a result, the amplitude and the waveform of the driving signal input to the piezoelectric element can vary compared to the case of normal temperatures, and these variations might adversely affect the driving characteristics of the ultrasonic motor.

Thus, the uniformity between the driving characteristics at high temperatures and those at low temperatures can be achieved, for example, by reducing the number of electrodes to supply the driving signal at high temperatures compared to low temperatures.

The pulse generation circuit 33 is a circuit to generate pulse signals for driving the A-phase piezoelectric element 12A and the B-phase piezoelectric element 12B of the ultrasonic motor 10.

The A-phase driving signal generation circuit 34A is a circuit to generate driving signals for the A-phase piezoelectric element 12A, based on the pulse signal from the pulse generation circuit 33.

The B-phase driving signal generation circuit 34B is a circuit to generate driving signals for the B-phase piezoelectric element 12B, based on the pulse signal from the pulse generation circuit 33.

The A-phase and the B-phase driving signal generation circuits 34A and 34B can independently supply the driving signals to individual wiring parts of the plurality of the wiring sections 35-1.

The wiring sections 35-1 are for connecting the A-phase driving signal generation circuit 34A and A-phase side FPCs 14A-1 to 14A-3 disposed correspondingly to the inner peripheral side, the central side and the outer peripheral side electrodes 122, respectively, and for connecting the B-phase driving signal generation circuit 34B and B-phase side FPCs 14B-1 to 14B-3 disposed correspondingly to the inner peripheral side, the central side and the outer peripheral side electrodes 122, respectively. The wiring sections 35-1 are for inputting the driving signals to be output from the A-phase and the B-phase driving signal generation circuits 34A and 34B to the A-phase and the B-phase piezoelectric elements 12A and 12B, respectively.

The wiring section 35-2 is wiring to ground the grounding FPC 14C via the grounding electrode 122-13. In the present embodiment, the grounding of the grounding FPC 14C is attained by connecting the grounding electrode 122-13 via the conductive material to the elastic body 13, as described above. Similarly, the electrode 123 formed on the back of the piezoelectric element 12 is also grounded by becoming conductive with the elastic body 13, as described above.

The switching control circuit 36 controls the ON/OFF of a FET (field effect transistor) 37a, based on the instruction from the MCU 32.

The power supply switching section 37 is independently switchable between the supply and the non-supply of driving signals to the A-phase side FPCs 14A-1 to 14A-3, and to the B-phase side FPCs 14B-1 to 14B-3 by the FET 37a as an electrical switching element.

Next, the operation of the ultrasonic motor driving device 30 will be described below.

The MCU 32 sends a driving instruction to the pulse generation circuit 33. The A-phase and the B-phase driving signal generation circuits 34A and 34B generate driving signals, respectively, based on the pulse signals from the pulse generation circuit 33. The generated driving signals are simultaneously input via the A-phase side FPCs 14A-1 to 14A-3, and the B-phase side FPCs 14B-1 to 14B-3, to the A-phase and the B-phase piezoelectric elements 12A and 12B, respectively.

Upon the receipt of the temperature information from the ambient temperature detecting section 31, the MCU 32 sends an instruction to the switching control circuit 36. Based on the instruction from the switching control circuit 36, the power supply switching section 37 performs switching of the supply of the driving signal.

For example, it is assumed that the MCU 32 initially drives the piezoelectric element 12 in the entire region. When the ambient temperature is increased, based on the detection result of the ambient temperature detecting section 31, the MCU 32 judges a temperature increase, and sends an instruction for reducing the number of the wiring sections 35-1 to supply driving signals compared to low temperatures, to the switching control circuit 36.

The MCU 32 further sends an instruction for supplying driving signals to electrodes having a symmetrical relationship with each other in the A-phase and the B-phase piezoelectric elements 12A and 12B, respectively, to the switching control circuit 36. For example, the supply of driving signals to the inner peripheral electrodes of the A-phase and the B-phase piezoelectric elements 12A and 12B may be stopped, or the supply of driving signals to the outer peripheral electrodes of the A-phase and the B-phase piezoelectric elements 12A and 12B may be stopped.

It is arbitrary whether to stop the supply of the driving signal to the inner peripheral electrode, and whether to stop the supply of the driving signal to the outer peripheral electrode. If a small change of the electrostatic capacity value is desired, the inner peripheral electrode having a small area may be controlled. If a large change of the electrostatic capacity value is desired, the outer peripheral electrode having a large area may be controlled.

Thus, the first embodiment produces the following effects.

(1) The plurality of the separately formed electrodes 122 are provided on the surface of the continuous region P of the polarization part 121a polarized in the certain direction. Therefore, by controlling the supply and the non-supply of the driving signals to these electrodes 122, the desired driving characteristics can be obtained depending on temperature, drive velocity, intended use and the like.

(2) The plurality of the electrodes 122 are arranged in the sections in the radial direction Y in the region P of the piezoelectric body 121. With this arrangement, the region of the piezoelectric body 121 can be fully utilized as these sections, and the area in the circumferential direction X, to which no driving signal is supplied, can be eliminated, thus permitting more efficient driving.

(3) The plurality of the electrodes 122 are wired so as to permit independent input of driving signals, thus enabling independent driving.

(4) The ultrasonic motor 10 is provided with the abovementioned piezoelectric element 12, making it possible to provide an ultrasonic motor 10 which makes it easy to obtain the desired driving characteristics.

(5) The independent control between the A-phase and the B-phase can be achieved by the A-phase and the B-phase driving signal generation circuits 34A and 34B, which are capable of independently supplying driving signals to the individual wiring parts of the plurality of the wiring sections 35-1.

(6) The MCU 32 supplies driving signals based on the detection result of the ambient temperature detecting section 31, thereby enabling the drive in accordance with the ambient temperature variations. Since it is possible to change the region of the piezoelectric element 12 to which the driving signal is input, the variations in the electrostatic capacity value of the piezoelectric element 12 can be suppressed efficiently, thus ensuring stable driving. No external element such as an external capacitor is required to change the electrostatic capacity value.

(7) The MCU 32, when the detection result of the ambient temperature detecting section 31 detect is a high temperature, controls to reduce the number of the wiring sections 35-1 to supply driving signals compared to the number for a low temperature. This enables the drive in accordance with the tendency of variations in electrostatic capacity value.

(8) The MCU 32 supplies driving signals to the symmetrically arranged electrodes of the A-phase and the B-phase piezoelectric elements 12A and 12B, so that the A-phase and the B-phase can be similarly driven, achieving efficient driving.

(9) The lens barrel 3 and the camera 1 are constructed by using the abovementioned ultrasonic motor 10 and the abovementioned ultrasonic motor driving device 30. It is therefore possible to provide a lens barrel 3 and camera 1 which facilitate the attainment of the desired driving characteristics and have excellent functionality.

Second Embodiment

Figure 5:
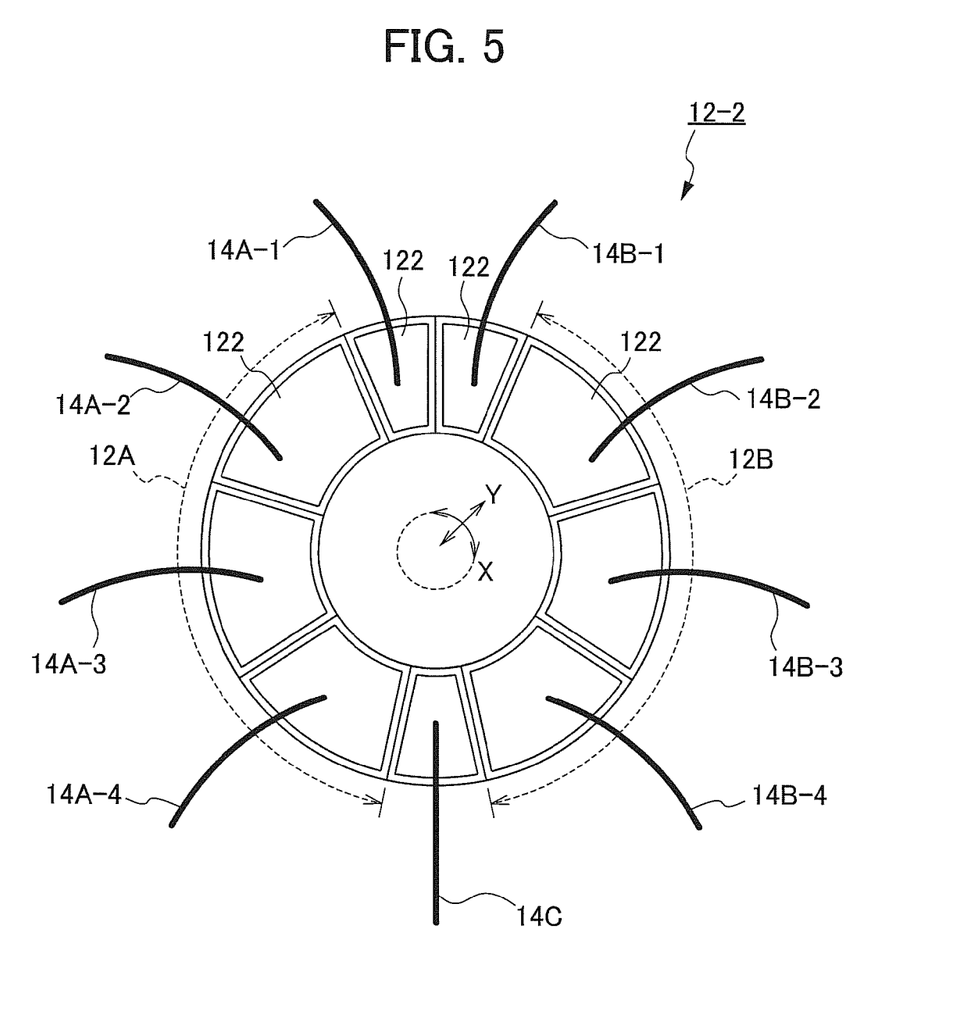
FIG. 5 is a drawing showing a piezoelectric element according to a second embodiment.

FIG. 5 is a drawing showing a piezoelectric element according to a second embodiment. For parts having the same function as the first embodiment, overlapping descriptions and drawings are omitted.

The piezoelectric element 12-2 of the second embodiment is different from the piezoelectric element 12 of the first embodiment in the method of dividing the electrodes, that is, the electrodes 122 are divided only in the circumferential direction X.

In the present embodiment, the A-phase side FPCs 14A-1 to 14A-4, and the B-phase side FPCs 14B-1 to 14B-4 are connected to the electrodes 122 divided in the circumferential direction X. These A-phase side FPCs 14A-1 to 14-4 and these B-phase side FPCs 14B-1 to 14B-4 are wired independently for each electrode, enabling the driving signals to be input independently to each electrode. The wiring sections 35-1 of the abovementioned ultrasonic motor 30 are connected to these FPCs, respectively, and driven in the same manner as the first embodiment. In the second embodiment, the wiring of the wiring sections 35-1 requires eight wires, which is greater than the number in the first embodiment by two.

With the second embodiment, the abovementioned piezoelectric element 12-2 can perform driving in accordance with temperature, drive velocity, intended use and the like, as in the case with the first embodiment.

Modifications

The following modifications may be made in the foregoing embodiments.

(1) Besides the rotary type ultrasonic motor 10, the embodiment of the invention is also applicable to a linear drive-type vibration motor in which a relatively moving member is linearly driven. In this case, a plurality of electrodes is preferably arranged in sections in a direction substantially orthogonal to the direction of relative motion of the relatively moving member. This is because it is possible to eliminate the region where no driving signal is supplied in the direction of relative movement.

(2) Besides an ultrasonic motor 10 that drives the moving body 15 by a progressive wave, the embodiment of the invention is also applicable to vibration wave motors and vibration actuators using other driving modes, such as rod type actuators, pencil type actuators and disc type actuators utilizing bending vibration and in-plane vibration.

(3) Besides the ultrasonic motor 10 using the ultrasonic region, the embodiment of the invention is also applicable to vibration actuators which do not use the ultrasonic region.

(4) Besides the case where the ultrasonic motor 10 is used as a driving source to perform the focus operation of the lens barrel 3, the ultrasonic motor 10 may be used as a driving source to perform the zoom operation of the lens barrel 3. Alternatively, the ultrasonic motor 10 may be used as the driving source of copying machines and the like, or the driving parts of tilt devices for steering wheels and headrests in automobiles.

(5) Besides the switching control using the FET 37a as an electrical switch, it may be controlled by using a mechanical switch.

(6) Instead of the single piezoelectric element 12, three piezoelectric elements 12 having different diameters may be telescopically arranged. The number of the electrode sections is not limited to that of the foregoing embodiments.

(7) Although in FIG. 3A, the B-phase side FPC 14B-1 is connected to the electrodes 122-1, 122-4, 122-7 and 122-10, four B-phase side FPCs 14B-1 may be connected to the electrodes 122-1, 122-4, 122-7 and 122-10, respectively, so that driving signals can be independently supplied to the respective electrodes. Alternatively, two B-phase side FPCs 14B-1 may be used so that driving signals can be independently supplied to the respective electrodes. This is true for other FPCs.

(8) Although in FIG. 4, the switching control is made by connecting the switching control circuit 36 and the power supply switching section 37 to the wiring sections 35-1, it may be made by connecting to the wiring section 35-2.

(9) Although the non-divided electrode 123 is provided on the side to be bonded to the elastic body 13 of the piezoelectric element 12, it is also possible to constitute the embodiment of the invention without the electrode 123. By bonding the elastic body 13 and the piezoelectric element 12 with conductive adhesive, the entire surface of the elastic body 13 which is in contact with the piezoelectric element 12 can be used as the grounded electrode (that is, the same operation as the electrode 123 in FIG. 3B is attainable). By connecting the elastic body 13 and the piezoelectric element 12 by a firing process or the like, without using adhesive, the entire surface of the elastic body 13 which is contacted with the piezoelectric element 12 can be used as the grounded electrode.

Figure 6:
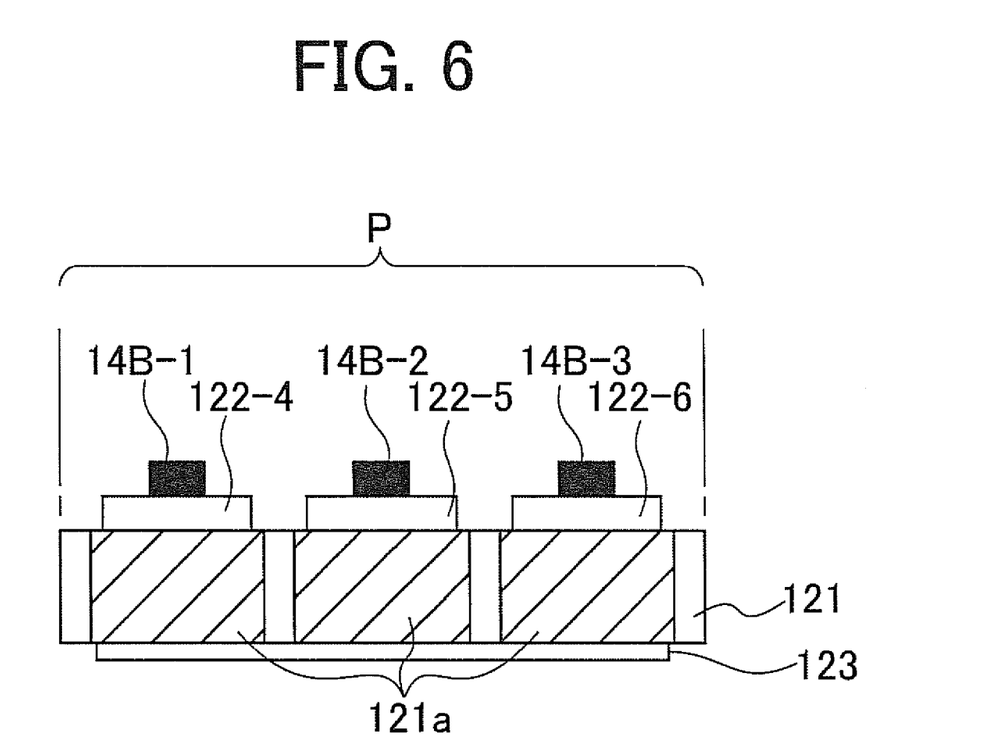
FIG. 6 is a drawing showing a modification of a piezoelectric body.

FIG. 6 is a drawing showing a modification of the piezoelectric body.

The piezoelectric body 121 has the polarization part 121a polarized in a certain direction substantially over the entire surface, as described with reference to FIG. 3B. Alternatively, as shown in FIG. 6, an unpolarized portion may be provided at a position corresponding to the boundary portions of a plurality of electrodes. With reference to FIG. 6, the polarization part 121a consists of three separated polarized portions with an unpolarized portion in between. The term "polarization part" in the present specification is a concept including an embodiment where two or more polarization parts are arranged with an unpolarized portion in between.

The embodiment shown in FIG. 3B corresponds to the case where the narrow space between the radically arranged electrodes 122 enables complete polarization even at the boundary portion between the electrodes, and the case where the electrode 122 is formed on substantially the entire surface, and part of the electrode is then removed. On the other hand, the embodiment shown in FIG. 6 corresponds to the case where the space between the electrodes 122 is slightly larger than that in FIG. 3B, failing to obtain complete polarization at the boundary portion between the electrodes.

Although the abovementioned embodiments and the abovementioned modifications may be combined suitably, the description thereof is omitted here. The invention is not to be considered to be limited by the foregoing description.

Obviously, numerous modifications and variations of the present invention are possible in light of the above teachings. It is therefore to be understood that within the scope of the appended claims, the invention may be practiced otherwise than as specifically described herein.

What is claimed is:

1. A vibration actuator driving device comprising:
a plurality of wiring sections disposed correspondingly to a plurality of electrically independent electrodes of an electromechanical conversion element, the wiring sections inputting driving signals to drive the electromechanical conversion element;
a supply controller capable of independently supplying a driving signal for each respective wiring section; and
a temperature detector to detect a temperature,
wherein the supply controller selects wiring sections from the plurality of wiring sections to supply the driving signal based on a detection result of the temperature detector.

2. The vibration actuator driving device according to claim 1, wherein
the supply controller is capable of making a selection between supply and non-supply of the driving signal to each wiring section.

3. The vibration actuator driving device according to claim 1, wherein
the temperature detector detects either one of the temperature of the electromechanical conversion element and the temperature in its vicinity.

4. The vibration actuator driving device according to claim 1, wherein
when the detection result of the temperature detector is a high temperature, the supply controller reduces the number of the wiring sections to supply the driving signals to a lower number than the case of a low temperature.

5. The vibration actuator driving device according to claim 1, wherein
the plurality of electrodes are arranged approximately symmetrically with respect to a predetermined line; and
the supply controller controls supply of the driving signals to the electrodes approximately symmetrically with respect to the predetermined line.

6. The vibration actuator driving device according to claim 5, wherein
the supply controller supplies the driving signals so as to have different phases for the respective approximately symmetric electrodes.

7. The vibration actuator driving device according to claim 4, wherein
the plurality of electrodes are arranged approximately symmetrically with respect to a predetermined line; and
the supply controller, when reducing the number of the wiring sections to supply the driving signals, stops supply of the driving signals to the respective wiring sections corresponding to the electrodes approximately symmetrically with respect to the predetermined line.

8. A lens barrel comprising:
a vibration actuator driving device according to claim 1; and
a lens to be driven by the vibration actuator.

9. A camera comprising:
a vibration actuator driving device according to claim 1; and
a lens to be driven by the vibration actuator.

10. A method of driving a vibration actuator comprising:
providing a plurality of wiring sections corresponding to a plurality of electrically independent electrodes of an electromechanical conversion element;
independently supplying driving signals to each of the plurality of wiring sections to drive the electromechanical conversion element;
providing a temperature detector to detect temperature; and
selecting wiring sections from the plurality of wiring sections to supply the driving signals based on a detection result of the temperature detector.

11. The method of driving a vibration actuator according to claim 10, further comprising:
making a selection between supply and non-supply of the driving signals to each of the plurality of wiring sections.

12. The method of driving a vibration actuator according to claim 10, including the step of:
reducing, when the detection result of the temperature detector is a high temperature, the number of the wiring sections to supply the driving signals to a lower number than the case of a low temperature.

* * * * *